(No Model.) 2 Sheets—Sheet 1.

F. H. MAYER.
VEHICLE BRAKE.

No. 605,735. Patented June 14, 1898.

WITNESSES:
Henry F. Kirsch.
C. R. Ferguson

INVENTOR
F. H. Mayer.
BY
ATTORNEYS.

THE NORRIS PETERS CO., PHOTO-LITHO., WASHINGTON, D. C.

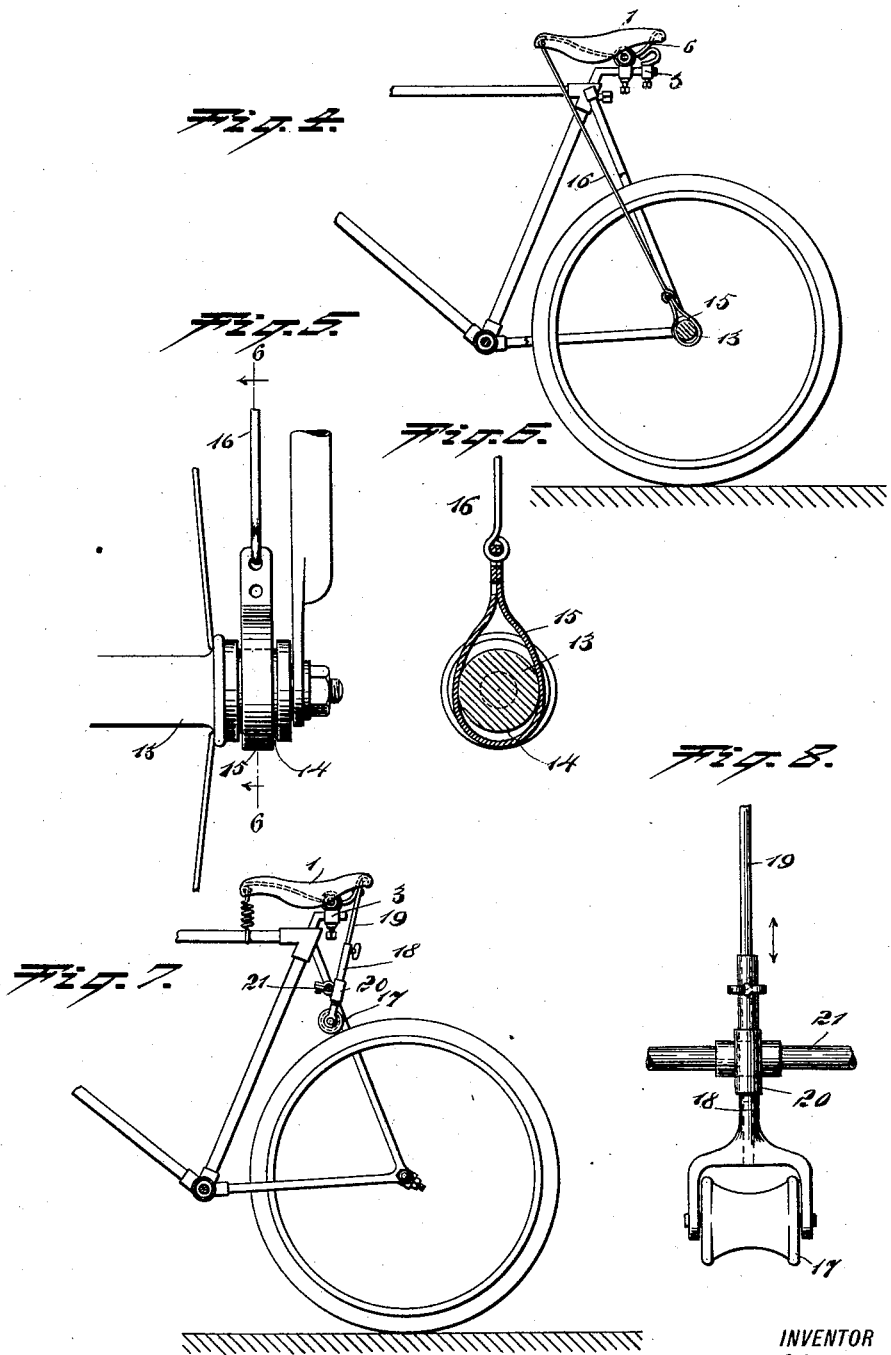

UNITED STATES PATENT OFFICE.

FRANK H. MAYER, OF DENVER, COLORADO.

VEHICLE-BRAKE.

SPECIFICATION forming part of Letters Patent No. 605,735, dated June 14, 1898.

Application filed January 20, 1897. Serial No. 619,888. (No model.)

*To all whom it may concern:*

Be it known that I, FRANK H. MAYER, of Denver, in the county of Arapahoe and State of Colorado, have invented new and useful Improvements in Vehicle-Brakes, of which the following is a full, clear, and exact description.

This invention relates particularly to brakes for bicycles and similar wheeled vehicles; and the object is to provide a brake that may be quickly applied by a rider in tilting the seat or saddle by a motion of his body, thus obviating the necessity of removing his hands from the handle-bar or his feet from the pedals, as is required with hand or foot operated brakes.

I will describe a vehicle-brake embodying my invention and then point out the novel features in the appended claims.

Reference is to be had to the accompanying drawings, forming a part of this specification, in which similar characters of reference indicate corresponding parts in all the views.

Figure 1:
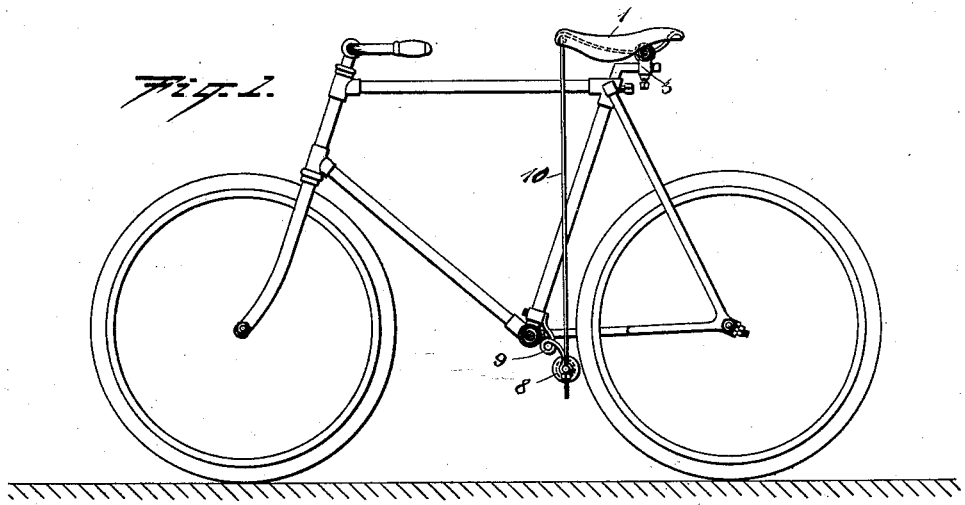
Figure 2:
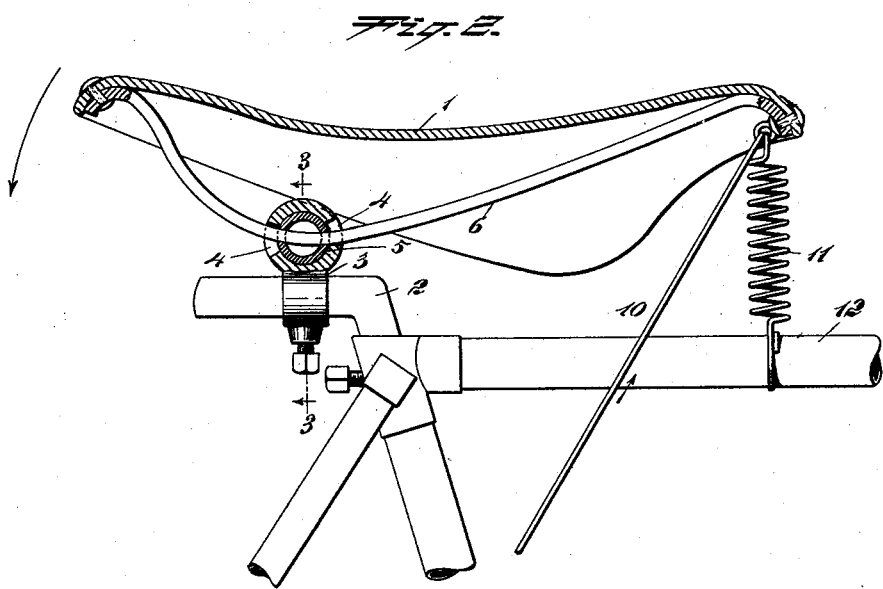
Figure 3:
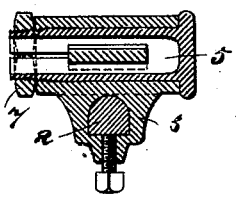

Figure 1 is a side elevation of a bicycle, showing my improved brake as applied thereto. Fig. 2 is a partial elevation and partial section drawn on an enlarged scale to clearly show the locking-seat section. Fig. 3 is a section on the line 3 3 of Fig. 2. Fig. 4 is a side elevation of a portion of a bicycle, showing a modified form of brake mechanism. Fig. 5 is a detail, drawn on an enlarged scale, of the brake mechanism shown in Fig. 4. Fig. 6 is a section on the line 6 6 of Fig. 5. Fig. 7 is a side elevation showing another modified form of brake mechanism, and Fig. 8 is a rear elevation of the brake mechanism shown in Fig. 7.

In all the examples of my improvement the saddle 1 is designed to rock relatively to the saddle-post 2, and for this purpose I employ a clip 3, designed to engage with the saddle-post and having a tubular portion provided with opposite slot-openings 4. Arranged within the tubular portion of the clip is a tubular rocking shaft 5. This tubular rocking shaft 5 is provided with opposite slot-openings in which the spring 6 of the saddle is designed to be clamped. As here shown, this tubular rocking shaft 5 is longitudinally slitted at one end and has a tapered screw-thread portion with which a clamping-nut 7 engages. Obviously by means of this nut 7 the spring 6 may be firmly clamped with relation to the shaft 5; but as the openings 4 in the tubular portion of the clip 3 are somewhat wider than the openings through the rocking shaft the said shaft may be rocked in the tubular portion by a rider throwing his weight on the rear portion or toward the rear portion of the saddle.

In the example of my improvement shown in Fig. 1 the brake consists of a roller 8, mounted on a spring yielding arm 9, secured to the frame of the bicycle. This brake-roller 8 is designed to engage with the periphery of the wheel below the axis of the wheel. From the arm 9 a rod 10 extends to a connection with the forward part of the saddle 1. The rod 10 may have a screw-thread engagement with the arm 9, so that said rod may be adjusted when it is desired to raise or lower the saddle.

In Fig. 2 I have shown an auxiliary coiled spring 11, connected at one end to the forward portion of the saddle and at the other end to the top bar 12 of the bicycle-frame. The rod 10 is in this instance connected to the front end of the saddle 1.

In Figs. 4, 5, and 6 I have shown a brake designed to be applied to the rear-wheel axle 13. In this case the axle 13, between the spokes and a member of the rear fork, is turned down to form a bearing 14, around which a strap 15 engages. From this strap 15 a connection 16 extends to the forward part of the saddle 1. The strap 15 may be provided with a series of holes, as illustrated in the drawings, to provide for an adjustment of the connection 16.

In Fig. 7 I have shown a brake-roller 17, designed to bear upon the upper side of the wheel and having journal-bearings in the bifurcated end of a telescopic rod, consisting of sections 18 and 19. The section 19 of the telescopic rod is attached to the rear portion of the saddle 1, and the section 18 of the rod is movable through a socket 20, attached to a cross-bar 21, secured to the rear fork of the bicycle-frame.

In each example of my improvement it will be seen that a rider by shifting his weight toward the rear portion of the saddle will tilt the same and cause the brake to be applied with sufficient friction to stop the rotary motion of the wheel.

It is well known that no dependence can be placed on a brake operated either by hand or foot power. In the case of a hand-brake the effort to grasp the brake-lever is always a frantic one and results in a loss of steering control. In foot-brakes none but a very expert rider can use them, as they necessitate the removing of the feet from the pedals, always a difficult and dangerous thing to do and impracticable to riders of a timid or nervous disposition. With my brake all the difficulties and dangers above enumerated are obviated and a full steering and propelling control is maintained.

Having thus described my invention, I claim as new and desire to secure by Letters Patent—

1. In a bicycle, a saddle-support, comprising a clip provided with a tubular portion having opposite openings, and a rocking shaft mounted in the tubular portion of the clip, the seat-spring being adapted to be secured in the rock-shaft and project out through the openings of the tubular portion of the clip, substantially as and for the purpose set forth.

2. In a bicycle, a seat-support, comprising a clip provided with a tubular portion having opposite openings, and a tubular rocking shaft mounted in the tubular portion of the clip and provided with opposite openings, said openings being smaller than the openings of the tubular portion of the clip, the said shaft being slitted longitudinally and having one end threaded to receive a nut, substantially as described.

3. In a bicycle, a saddle, a saddle-post clip having a tubular portion provided with opposite slot-openings, a rocking and clamping clip in said tubular portion and having openings through which the saddle-spring extends, the said openings being smaller than those of the tubular portion of the clip, a brake designed to be engaged with a portion of a wheel of a bicycle, and a connection between said brake and one end of the saddle, substantially as specified.

4. In a bicycle, the combination with the rear axle having a bearing between the hub of the wheel and a member of the fork, of a saddle, a clip having a rocking shaft in which the spring of the saddle is secured, a strap engaging the bearing of the axle, and a connection between the forward end of the saddle and the strap, substantially as described.

FRANK H. MAYER.

Witnesses:
LEWIS B. FRANCE,
ALVIN MARSH.